United States Patent
Fu et al.

(10) Patent No.: US 9,872,015 B2
(45) Date of Patent: Jan. 16, 2018

(54) METHOD AND APPARATUS FOR IMPROVED IN-LOOP FILTERING

(75) Inventors: Chih-Ming Fu, Hsinchu (TW);
Ching-Yeh Chen, Taipei (TW);
Chia-Yang Tsai, New Taipei (TW);
Yu-Wen Huang, Taipei (TW);
Shaw-Min Lei, Hsinchu County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 275 days.

(21) Appl. No.: 13/992,472

(22) PCT Filed: Apr. 20, 2012

(86) PCT No.: PCT/CN2012/074456
§ 371 (c)(1),
(2), (4) Date: Jun. 7, 2013

(87) PCT Pub. No.: WO2012/142966
PCT Pub. Date: Oct. 26, 2012

(65) Prior Publication Data
US 2013/0259118 A1  Oct. 3, 2013

Related U.S. Application Data

(60) Provisional application No. 61/477,689, filed on Apr. 21, 2011, provisional application No. 61/547,281, (Continued)

(51) Int. Cl.
*H04N 7/12* (2006.01)
*H04N 11/02* (2006.01)
(Continued)

(52) U.S. Cl.
CPC ..... *H04N 19/00066* (2013.01); *H04N 19/177* (2014.11); *H04N 19/463* (2014.11); *H04N 19/70* (2014.11); *H04N 19/82* (2014.11)

(58) Field of Classification Search
CPC .......... H04N 19/00066; H04N 19/117; H04N 19/70; H04N 19/82; H04N 19/463
(Continued)

(56) References Cited

U.S. PATENT DOCUMENTS

| 7,650,043 B2 | 1/2010 | Shim et al. |
| 9,736,475 B2 | 8/2017 | Kim et al. |

(Continued)

FOREIGN PATENT DOCUMENTS

| CN | 1581980 A | 2/2005 |
| CN | 101790089 A | 7/2010 |

(Continued)

OTHER PUBLICATIONS

Samsung's Response to the Call for Proposals on Video Compression Technology Document: JCTVC-A124 1st Meeting: Dresden, DE, Apr. 15-23, 2010.*

(Continued)

*Primary Examiner* — Jeremaiah C Hallenbeck-Huber
(74) *Attorney, Agent, or Firm* — McClure, Qualey & Rodack, LLP

(57) ABSTRACT

Video decoding and encoding with in-loop processing of reconstructed video are disclosed. At the decoder side, a flag is received from the video bitstream and according to the flag, information associated with in-loop filter parameters is received either from a data payload in the video bitstream to be shared by two or more coding blocks or individual coding block data in the video bitstream. At the encoder side, information associated with the in-loop filter parameters is incorporated either in a data payload in a video bitstream to be shared by two or more coding blocks or interleaved with individual coding block data in the video bitstream accord- (Continued)

| $P_1$ | $P_2$ | $P_3$ |
| $P_4$ | C | $P_5$ |
| $P_6$ | $P_7$ | $P_8$ | ing to a flag. The data payload in the video bitstream is in a picture level, Adaptation Parameter Set (APS), or a slice header.

3 Claims, 13 Drawing Sheets

Related U.S. Application Data filed on Oct. 14, 2011, provisional application No. 61/595,914, filed on Feb. 7, 2012, provisional application No. 61/595,900, filed on Feb. 7, 2012, provisional application No. 61/597,995, filed on Feb. 13, 2012, provisional application No. 61/600,028, filed on Feb. 17, 2012.

(51) Int. Cl.
| | |
|---|---|
| H04N 11/04 | (2006.01) |
| H04N 19/117 | (2014.01) |
| H04N 19/70 | (2014.01) |
| H04N 19/177 | (2014.01) |
| H04N 19/463 | (2014.01) |
| H04N 19/82 | (2014.01) |

(58) Field of Classification Search
USPC .......................................... 375/240; 382/232
See application file for complete search history.

(56) References Cited

U.S. PATENT DOCUMENTS

| | | | | |
|---|---|---|---|---|
| 2008/0008239 | A1* | 1/2008 | Song | 375/240.12 |
| 2010/0272191 | A1* | 10/2010 | Dorea | H04N 19/159 |
| | | | | 375/240.29 |
| 2010/0329361 | A1* | 12/2010 | Choi et al. | 375/240.29 |
| 2011/0038422 | A1* | 2/2011 | Cheon et al. | 375/240.18 |
| 2012/0163452 | A1* | 6/2012 | Horowitz | 375/240.12 |
| 2012/0177116 | A1* | 7/2012 | Panusopone et al. | 375/240.12 |
| 2013/0016785 | A1* | 1/2013 | Wang et al. | 375/240.16 |

FOREIGN PATENT DOCUMENTS

| | | |
|---|---|---|
| CN | 101990098 A | 3/2011 |
| WO | 2009074117 A1 | 6/2009 |
| WO | WO 2010/044569 A2 | 4/2010 |
| WO | 2010061607 A1 | 6/2010 |
| WO | 2010146771 A1 | 12/2010 |
| WO | WO 2011/157084 | 12/2011 |
| WO | WO 2012/092777 | 7/2012 |
| WO | WO 2012/092787 | 7/2012 |

OTHER PUBLICATIONS

Chia-Yang Tsai et al., CE4 Subset3: Slice Common Information Sharing, Joint Collaborative Team on Video Coding (JCT-VC) of ITU-T SG16 WP3 and ISO/IEC JTC1/SC29/WG11, JCTVC-E045, 5th Meeting: Mar. 16-23, 2011, pp. 1-7, Geneva, CH.
Chih-Ming Fu et al., CE13: Sample Adaptive Offset with LCU-Independent Decoding, Joint Collaborative Team on Video Coding (JCT-VC) of ITU-T SG16 WP3 and ISO/IEC JTC1/SC29/WG11, JCTVC-E049, 5th Meeting: Mar. 16-23, 2011, pp. 1-6, Geneva, CH.
Stephan Wenger et al., Adaptation Parameter Set (APS), Joint Collaborative Team on Video Coding (JCTVC) of ITU-T SG16 WP3 and ISO/IEC JTC1/SC 29/WG11, JCTVC-F747r3, 6th Meeting: Jul. 14-22, 2011, pp. 1-10, Torino, IT.
Chih-Wei Hsu et al., Non-CE1: Unified SAO interleaving syntax in APS and slice header, Joint Collaborative Team on Video Coding (JCT-VC) of ITU-T SG16 WP3 and ISO/IEC JTC1/SC29/WG11, 9th Meeting: Geneva, CH, Apr. 2012, JCTVC-I0384, pp. 1-3.
Chih-Ming Fu et al., CE8 Subset3: Picture Quadtree Adaptive Offset, Joint Collaborative Team on Video Coding (JCT-VC) of ITU-TSG16 WP3 and ISO/IEC JTC1/SC29/WG11, 4th Meeting: Daegu, KR, Jan. 2011, JCTVC-D122_r3, pp. 1-10.
Huang, Y.W., et al., "In-Loop Adaptive Restoration;" Joint Collaborative Team on Video Coding (JCT-VC) of ITU-T SG16 WP3 and ISO/IEC JTC1/SC29/WG11; Jul. 2010; pp. 1-11.
Sullivan, G., et al.; "Meeting report of the fifth meeting of the Joint Collaborative Team on Video Coding (JCT-VC)-2;" Joint Collaborative Team on Video Coding (JCT-VC) of ITU-T SG16 WP3 and ISO/IEC JTC1/SC29/WG11; Mar. 2011; pp. 1-80.
Wenger, S., et al.; "Slice parameter set," Joint Collaborative Team on Video Coding (JCT-VC) of ITU-T SG16 WP3 and ISO/IEC JTC1/SC29/WG11; Mar. 2011; pp. 1-4.
Fu, C.M., et al.; "Sample Adaptive Offset in the HEVC Standard;" IEEE Transactions of Circuits and Systems for Video Teechnology; vol. 22; No. 12; Dec. 2012; pp. 1-10.
Fu, C.M., et al.; "Sample Adaptive Offset for Chroma;" Joint Collaborative Team on Video Coding (JCT-VC) of ITU-T SG16 WP3 and ISO/IEC JTC1/SC29/WG11; Jul. 2011; pp. 1-5.
Fu, C.M., et al; "CE13: Sample Adaptive Offset with LCU-Independent Decoding;" Joint Collaborative Team on Video Coding (JCT-VC) of ITU-T SG 16 WP3 and ISO/IEC JTC1/SC29/WG11; Mar. 2011; pp. 1-6.
Maani, E., et al. "Flexible Band Offset Mode in SAO;" Joint Collaborative Team on Video Coding (JCT-VC) of ITU-T SG 16 WP3 and ISO/IEC JTC1/SC29/WG11; Feb. 2012; pp. 1-4.
Fu, F.M., et al.; "Non-CE1: Bug-fix of offset coding in SAO interleaving mode;" Joint Collaborative Team on Video coding (JCT-VC) of ITU-T SG 16 WP3 and ISO/IEC JTC1/SC29/WG11; Apr.-May 2012; pp. 1-3.
Laroche, G., et al.; "On additional SAO Band Offset classifications;" Joint Collaborative Team on Video Coding (JCT-VC) of ITU-T SG 16 WP3 and ISO/IEC JTC1/SC29/WG11; Nov. 2011; pp. 1-7.
Kim, W.S., et al..; "CE8 Subset d.1: Reduced Number of Band Offsets in SAO;" Joint Collaborative Team on Video coding (JCT-VC) of ITU-T SG 16 WP3 and ISO/IEC JTC1/SC29/WG11; Feb. 2012.
Fu, C.M., et al.; "Sample Adaptive Offset in the HEVC Standard;" IEEE Transactions on Circuits and Systems for Video Technology; vol. 22; No. 12; Dec. 2012; pp. 1755-1764.

* cited by examiner

| seq_parameter_set_rbsp( ) { | Descriptor |
|---|---|
| ... | . |
|   loop_filter_across_slice_flag | u(1) |
|   sample_adaptive_offset_enabled_flag | u(1) |
| ... | |
| } | |

Fig. 4

| aps_rbsp( ) { | Descriptor |
|---|---|
|   aps_id | ue(v) |
|   ... | |
|   aps_sao_interleaving_flag | u(1) |
|   if( !aps_sao_interleaving_flag ) { | |
|     aps_sample_adaptive_offset_flag | u(1) |
|     if( aps_sample_adaptive_offset_flag ) | |
|       aps_sao_param( ) | |
|   } | |
|   ... | |
| } | |

Fig. 5

| | |
|---|---|
| aps_sao_param( ) { | Descriptor |
|   sao_cb_enable_flag | u(1) |
|   sao_cr_enable_flag | u(1) |
|   sao_num_lcu_in_width_minus1 | ue(v) |
|   sao_one_luma_unit_flag | u(1) |
|   if (sao_one_luma_unit_flag) | |
|     sao_offset_vlc( 0, 0, 0 ) | |
|   if ( sao_cb_enable_flag ){ | |
|     sao_one_cb_unit_flag | u(1) |
|     if ( sao_one_cb_unit_flag ) | |
|       sao_offset_vlc( 0, 0, 1 ) | |
|   } | |
|   if ( sao_cr_enable_flag ){ | |
|     sao_one_cr_unit_flag | u(1) |
|     if ( sao_one_cr_unit_flag ) | |
|       sao_offset_vlc( 0, 0, 2 ) | |
|   } | |
|   for ( ry = 0; ry < sao_num_lcu_in_height_minus1+1; ry++ ) { | |
|     for ( rx = 0; rx < sao_num_lcu_in_width_minus1+1; rx++ ) { | |
|       if ( aps_sample_adaptive_offset_flag && ! sao_one_luma_unit_flag ) { | |
|         if ( ry > 0 && rx == 0 ) | |
|           sao_repeat_row_flag[ 0 ] | u(1) |
|         sao_unit_vlc(rx, ry, 0 ) | |
|       } | |
|       if ( sao_cb_enable_flag && ! sao_one_cb_unit_flag ) { | |
|         if ( ry > 0 && rx == 0 ) | |
|           sao_repeat_row_flag[ 1 ] | u(1) |
|         sao_unit_vlc(rx, ry, 1 ) | |
|       } | |
|       if ( sao_cr_enable_flag && !sao_one_cr_unit_flag ) { | |
|         if ( ry > 0 && rx == 0 ) | |
|           sao_repeat_row_flag[ 2 ] | u(1) |
|         sao_unit_vlc( rx, ry, 2 ) | |
|       } | |
|     } | |
|   } | |
| } | |

Fig. 6

| sao_unit_vlc( rx, ry, cIdx ){ | Descriptor |
|---|---|
| if ( !sao_repeat_row_flag[ cIdx ] ) { | |
| if ( rx == 0 \|\| run[ cIdx ][ rx ][ ry ] < 0 ) { | |
| if ( ry == 0 ) | |
| saoRun[ cIdx ][ rx ][ ry ] = sao_run_diff | u(v) |
| else | |
| saoRun[ cIdx ][ rx ][ ry ] = sao_run_diff + saoRun[ cIdx ][ rx ][ ry − 1 ] | se(v) |
| } | |
| saoRun[ cIdx ][ rx + 1 ][ ry ] = saoRun[ cIdx ][ rx ][ ry ] − 1 | |
| if ( rx == 0 \|\| saoRun[ cIdx ][ rx ][ ry ] < 0) { | |
| if ( ry > 0 ) | |
| sao_merge_up_flag | u(1) |
| if ( !sao_merge_up_flag ) | |
| sao_offset_vlc( rx, ry, cIdx) | |
| } | |
| } else { | |
| saoRun[ cIdx ][ ry ][ rx ] = saoRun[ cIdx ][ ry − 1 ][ rx ] | |
| } | |
| } | |

Fig. 7

| sao_offset_vlc( rx, ry, cIdx ) { | Descriptor |
|---|---|
| sao_type_idx[ cIdx ][ rx ][ ry ] | ue(v) |
| if( sao_type_idx[ cIdx ][ rx ][ ry ] == 5 ) { | |
| sao_band_position[ cIdx ][ rx ][ ry ] | u(5) |
| for( i = 0; i < 4; i++ ) | |
| sao_offset[ cIdx ][ rx][ ry ][ i ] | se(v) |
| } | |
| else if( sao_type_idx[ cIdx ][ rx ][ ry ] != 0 ) | |
| for( i = 0; i < 4; i++ ) | |
| sao_offset[ cIdx ][ rx][ ry ][ i ] | ue(v) |
| } | |

Fig. 8

| slice_header( ) { | Descriptor |
|---|---|
| ... | |
|     if( scaling_list_enable_flag \|\|<br>        deblocking_filter_in_APS_enabled_flag \|\|<br>        sample_adaptive_offset_enabled_flag \|\|<br>        adaptive_loop_filter_enabled_flag ) { | |
|       if( sample_adaptive_offset_enabled_flag ) { | |
|         slice_sao_interleaving_flag | u(1) |
|         slice_sample_adaptive_offset_flag | u(1) |
|         if( slice_sao_interleaving_flag ) { | |
|           if( slice_sample_adaptive_offset_flag ) { | |
|             sao_cb_enable_flag | u(1) |
|             sao_cr_enable_flag | u(1) |
|           } | |
|         } | |
|       } | |
|       aps_id | ue(v) |
|     } | |
| ... | |
| } | |

Fig. 9

| slice_data( ) { | Descriptor |
|---|---|
| ... | |
|   do { | |
|     xCtb = horizontal location of largest coding unit | |
|     yCtb = vertical location largest coding unit | |
|     ... | |
|     CtbAddrInSlice = first largest coding unit location in current slice | |
|     If above largest coding unit is available set AddrUp larger than 0, otherwise, set AddrUp = -1 | |
|     if( slice_sao_interleaving_flag ) { | |
|       if(slice_sample_adaptive_offset_flag) | |
|         sao_unit_cabac( xCtb, yCtb, 0 ) | |
|       if(sao_cb_enable_flag) | |
|         sao_unit_cabac( xCtb, yCtb, 1 ) | |
|       if(sao_cr_enable_flag) | |
|         sao_unit_cabac( xCtb, yCtb, 2 ) | |
|     } | |
|     ... | |
|   } while( next largest coding unit data is exist ) | |
| } | |

Fig. 10

| sao_unit_cabac( rx, ry, cIdx ){ | Descriptor |
|---|---|
|   if ( rx > 0 && CtbAddrInSlice != 0 ) | |
|     sao_merge_left_flag | ae(v) |
|   if ( !sao_merge_left_flag ) { | |
|     if ( ry > 0 && ( AddrUp > 0 || loop_filter_across_slice_flag ) ) | |
|       sao_merge_up_flag | ae(v) |
|     if ( !sao_merge_up_flag ) | |
|       sao_offset_cabac( rx, ry, cIdx ) | |
|   } | |
| } | |

Fig. 11

| sao_offset_cabac( rx, ry, cIdx ) { | Descriptor |
|---|---|
| sao_type_idx[ cIdx ][ rx ][ ry ] | ae(v) |
| if( sao_type_idx[ cIdx ][ rx ][ ry ] == 5 ) | |
| sao_band_position[ cIdx ][ rx ][ ry ] | ae(v) |
| if( sao_type_idx[ cIdx ][ rx ][ ry ] != 0 ) | |
| for( i = 0; i < 4; i++ ) | |
| sao_offset[ cIdx ][ rx ][ ry ][ i ] | ae(v) |
| } | |

*Fig. 12*

| seq_parameter_set_rbsp( ) { | Descriptor |
|---|---|
| profile_idc | u(8) |
| reserved_zero_8bits /* equal to 0 */ | u(8) |
| level_idc | u(8) |
| seq_parameter_set_id | ue(v) |
| ....... | |
| adaptive_loop_filter_enabled_flag | u(1) |
| if( adaptive_loop_filter_enabled_flag ) | |
| alf_coef_in_slice_flag | u(1) |
| ...... | |
| } | |

Fig. 13

| slice_header( ) { | Descriptor |
|---|---|
|   first_slice_in_pic_flag | u(1) |
|   if( first_slice_in_pic_flag = = 0 ) | |
|     slice_address | u(v) |
|   slice_type | ue(v) |
|   ….. | |
|   if( adaptive_loop_filter_enabled_flag ) { | |
|     slice_adaptive_loop_filter_flag | u(1) |
|     if( slice_adaptive_loop_filter_flag && alf_coef_in_slice_flag ) | |
|       alf_param( ) | |
|     if( slice_adaptive_loop_filter_flag && !alf_coef_in_slice_flag ) | |
|       alf_cu_control_param( ) | |
|   } | |
| …….. | |
| } | |

Fig. 14

| alf_param() { | Descriptor |
|---|---|
|   alf_cb_enable_flag | u(1) |
|   alf_cr_enable_flag | u(1) |
|   alf_one_luma_unit_per_slice_flag | |
|   if( alf_cb_enable_flag ) | |
|     alf_one_cb_unit_per_slice_flag | u(1) |
|   if( alf_cr_enable_flag ) | |
|     alf_one_cr_unit_per_slice_flag | |
|   if( !alf_coef_in_slice_flag ) { | |
|     alf_num_lcu_in_width_minus1 | ue(v) |
|     alf_num_lcu_in_height_minus1 | ue(v) |
|   } else { | |
|     alf_num_lcu_in_slice_minus1 | u(v) |
|   } | |
| endCtbrY = (numCtb − 1 + firstCtbAddr) / numCtbInWidth | |
| endCtbrX = (numCtb − 1 + firstCtbAddr) % numCtbInWidth | |
| for ( i = 0; i < numCtb; i++ ) { | |
|   rx = ( i + firstCtbAddr)  % numCtbInWidth | |
|   ry = ( i + firstCtbAddr)  / numCtbInWidth | |
|   endrX = ( ry == endCtbrY ) ? ( endCtbrX ) : ( numCtbInWidth − 1 ) | |
|   if( ( rx == 0 ) && ( i − numCtbInWidth >= 0 ) && ( alf_one_luma_unit_per_slice_flag ==0 ) ) | |
|     alf_repeat_row _flag[0] | u(1) |
|   alf_unit ( rx, ry, 0, i, endrX, alf_one_luma_unit_per_slice_flag ) | |
|   if( alf_cb_enable_flag ) { | |
|     if( ( rx == 0 ) && ( i − numCtbInWidth >= 0 ) && ( alf_one_cb_unit_per_slice_flag ==0 ) ) | |
|       alf_repeat_row _flag[1] | u(1) |
|     alf_unit (rx, ry, 1, i, endrX, alf_one_cb_unit_per_slice_flag ) | |
|   } | |
|   if( alf_cr_enable_flag ) { | |
|     if( ( rx == 0) && ( i − numCtbInWidth>= 0) && ( alf_one_cr_unit_per_slice_flag ==0 ) ) | |
|       alf_repeat_row _flag[2] | u(1) |
|     alf_unit (rx, ry, 2, i, endrX, alf_one_cr_unit_per_slice_flag ) | |
|   } | |
| } | |
| } | |

Fig. 15

| | Descriptor |
|---|---|
| alf_unit(rx, ry, cIdx, lcuIdx, endrX, oneUnitFlag ) { | |
|   if( oneUnitFlag ) { | |
|     if ( lcuIdx = = 0 ) { | |
|       alf_lcu_enable_flag[ cIdx ][ ry ][ rx ] | u(1) |
|       if( alf_lcu_enable_flag[ cIdx ][ ry ][ rx ] ) | |
|         alf_info( rx, ry, cIdx ) | |
|     } | |
|   } else { | |
|     if( !alf_repeat_row_flag[ cIdx ] ) { | |
|       if( rx = = 0 || alfRun[ cIdx ][ ry ][ rx ] < 0 ) { | |
|         if( lcuIdx −numCtbInWidth < 0 ) | |
|           alfRun[ cIdx ][ ry ][ rx ] = 0 + alf_run_diff | u(v) |
|         else | |
|           alfRun[ cIdx ][ ry ][ rx ] = alfRun[ cIdx ][ ry − 1 ][ rx ]+ alf_run_diff | s(v) |
|       } | |
|       alfRun[ cIdx ][ ry ][ rx+ 1 ] = alfRun[ cIdx ][ ry ][ rx ] − 1 | |
|       if ( rx == 0 || alfRun [ cIdx ] [ rx ][ ry ] < 0) { | |
|         if ( ry > 0 && ( lcuIdx − numCtbInWidth > = 0 || alfAcrossSlice) ) | |
|           alf_merge_up_flag | u(1) |
|         if( !alf_merge_up_flag ) { | |
|           alf_lcu_enable_flag[ cIdx ][ ry ][ rx ] | u(1) |
|           if( alf_lcu_enable_flag[ cIdx ][ ry ][ rx ] ) | |
|             alf_info ( rx, ry, cIdx ) | |
|         } | |
|       } | |
|     } else | |
|       alfRun[ cIdx ][ ry ][ rx ] = alfRun[ cIdx ][ ry − 1 ][ rx ] | |
|   } | |
| } | |

Fig. 16

| alf_info ( rx, ry, cIdx ) { | Descriptor |
|---|---|
| if(NumALFFiltersInStoredBuffer[cIdx] > 0) | |
|    alf_new_filter_set_flag | u(1) |
|    if( alf_new_filter_set_flag = = 0 && NumALFFiltersInStoredBuffer[cIdx] > | |
|      alf_stored_filter_set_idx[ cIdx ] | u(v) |
| } else { | |
|   if( cIdx = = 0 ) { | |
|     alf_no_filters_minus1 | ue(v) |
|     if( alf_no_filters_minus1 = = 1 ) { | |
|      alf_start_second_filter | ue(v) |
|     } else if( alf_no_filters_minus1 > 1 ) { | |
|      for ( i = 1; i < 15; i++ ) | |
|       alf_filter_pattern_flag[ cIdx ][ ry ][ rx ][ i ] | u(1) |
|     } | |
|     if( alf_no_filters_minus1 > 0 ) | |
|      alf_pred_flag[ cIdx ][ ry ][ rx ] | u(1) |
|     for ( i = 0; i < AlfNumFilters; i++ ) | |
|      alf_nb_pred_luma_flag[ cIdx ][ ry ][ rx ][ i ] | u(1) |
|     if( AlfNumFilters > 1 ) { | |
|      alf_min_kstart_minus1 | ue(v) |
|      for ( i = 1; i < 4; i++ ) | |
|       alf_golomb_index_flag[ i ] | u(1) |
|     } | |
|     for ( i = 0; i < AlfNumFilters; i++ ) { | |
|      for ( j = 0; j < AlfCodedLength; j++ ) | |
|       alf_filt_coeff[ cIdx ][ ry ][ rx ][ i ][ j ] | ge(v) |
|     } | |
|   } else { | |
|     for ( j = 0; j < AlfCodedLength; j++ ) | |
|      alf_filt_coeff[ cIdx ][ ry ][ rx ][ 0 ][ j ] | se(v) |
|     } | |
|   } | |
| } | |

METHOD AND APPARATUS FOR IMPROVED IN-LOOP FILTERING

CROSS REFERENCE TO RELATED APPLICATIONS

The present invention claims priority to U.S. Provisional Patent Application Ser. No. 61/477,689, filed Apr. 21, 2011, entitled "Improved Sample Adaptive Offset", U.S. Provisional Patent Application Ser. No. 61/547,281, filed Oct. 14, 2011, entitled "Low Latency Loop Filtering", U.S. Provisional Patent Application Ser. No. 61/595,900, filed Feb. 17, 2012, entitled "Improved Sample Adaptive Offset", U.S. Provisional Patent Application Ser. No. 61/595,914, filed Feb. 7, 2012, entitled "Improved LCU-based Encoding Algorithm of ALF", U.S. Provisional Patent Application Ser. No. 61/597,995, filed Feb. 13, 2012, entitled "Improved ALF and SAO", and U.S. Provisional Patent Application Ser. No. 61/600,028, filed Feb. 17, 2012, entitled "LCU-based Syntax for SAO and ALF". The U.S. Provisional patent applications are hereby incorporated by reference in their entireties.

TECHNICAL FIELD

The present invention relates to video coding system. In particular, the present invention relates to method and apparatus for improved in-loop processing such as SAO and ALF.

BACKGROUND

Motion estimation is an effective inter-frame coding technique to exploit temporal redundancy in video sequences. Motion-compensated inter-frame coding has been widely used in various international video coding standards The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate compressed video bitstream. During the encoding process, coding artifacts are introduced, particularly in the quantization process. In order to alleviate the coding artifacts, additional processing has been applied to reconstructed video to enhance picture quality in newer coding systems. The additional processing is often configured in an in-loop operation so that the encoder and decoder may derive the same reference pictures to achieve improved system performance.

FIG. 1A illustrates an exemplary adaptive inter/intra video coding system incorporating in-loop processing. For inter-prediction, Motion Estimation (ME)/Motion Compensation (MC) 112 is used to provide prediction data based on video data from other picture or pictures. Switch 114 selects Intra Prediction 110 or inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. When an inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In the High Efficiency Video Coding (HEVC) standard being developed, Deblocking Filter (DF) 130, Sample Adaptive Offset (SAO) 131 and Adaptive Loop Filter (ALF) 132 have been developed to enhance picture quality. The in-loop filter information may have to be incorporated in the bitstream so that a decoder can properly recover the required information. Therefore, in-loop filter information from SAO and ALF is provided to Entropy Encoder 122 for incorporation into the bitstream. In FIG. 1A, DF 130 is applied to the reconstructed video first; SAO 131 is then applied to DF-processed video; and ALF 132 is applied to SAO-processed video. However, the processing order among DF, SAO and ALF can be re-arranged.

A corresponding decoder for the encoder of FIG. 1A is shown in FIG. 1B. The video bitstream is decoded by Video Decoder 142 to recover the transformed and quantized residues, SAO/ALF information and other system information. At the decoder side, only Motion Compensation (MC) 113 is performed instead of ME/MC. The decoding process is similar to the reconstruction loop at the encoder side. The recovered transformed and quantized residues, SAO/ALF information and other system information are used to reconstruct the video data. The reconstructed video is further processed by DF 130, SAO 131 and ALF 132 to produce the final enhanced decoded video.

HEVC has adopted ALF as a non-deblocking in-loop filter to enhance the coding performance. In HEVC Test Model version 5.0, a picture-based ALF encoding algorithm is described. However, a LCU-based encoding scheme or LCU-based pipeline process is usually used for video encoder and decoder implementations due to more efficient memory usage, less memory bandwidth, or lower hardware cost. Therefore, the LCU-based ALF is a preferred approach. However, it is desirable to further improve the performance of ALF processing.

SAO is another in-loop processing adopted by HEVC to enhance picture quality. SAO consists of two methods. One is Band Offset (BO), and the other is Edge Offset (EO). BO is used to classify pixels into multiple bands according to pixel intensities and an offset is applied to pixels in each band. EO is used to classify pixels into categories according to relations with neighbors and an offset is applied to pixels in each category. In HM-5.0, a region can select 7 different SAO types: 2 BO groups (outer group and inner group), 4 EO directional patterns (0°, 90°, 135°, and 45°) and no processing (OFF). Moreover, a picture can be further divided into multiple regions by using a quad-tree partitioning method or be divided into largest coding unit (LCU) regions, and each region has its own SAO type and offset values. It is desirable to further improve the performance of SAO processing by improving SAO parameters signalling.

SUMMARY

A method and apparatus for video decoding with in-loop processing of reconstructed video are disclosed. According to one embodiment of the present invention, the method comprises recovering reconstructed video data from a video bitstream; receiving a flag from the video bitstream; receiving information associated with in-loop filter parameters from a data payload in the video bitstream to be shared by two or more coding blocks or individual coding block data in the video bitstream according to the flag; and applying the in-loop processing to coding blocks of the reconstructed video. The in-loop processing may correspond to Adaptive Loop Filter (ALF) or Sample Adaptive Offset (SAO). The coding block may correspond to a coding unit (CU), multiple CUs, a largest coding unit (LCU) or multiple LCUs. The data payload in the video bitstream is in a picture level, Adaptation Parameter Set (APS), or a slice header. In one embodiment of the present invention, the flag is an interleaving flag which is used to select whether the information associated with the in-loop filter parameters is incorporated in the data payload in the video bitstream or interleaved with individual coding block data in the video bitstream. In another embodiment of the present invention, the flag is in a sequence level and the information associated with the in-loop filter parameters is incorporated in Adaptation Parameter Set (APS), or a slice header according to the flag.

A method and apparatus for video encoding with in-loop processing of reconstructed video are disclosed. According to one embodiment of the present invention, the method comprises receiving reconstructed video data; determining in-loop filter parameters associated with in-loop processing, wherein the in-loop processing is applied to coding blocks of the reconstructed video; and incorporating information associated with the in-loop filter parameters in a data payload in a video bitstream to be shared by two or more coding blocks or interleaved with individual coding block data in the video bitstream according to a flag. The in-loop processing may correspond to Adaptive Loop Filter (ALF) or Sample Adaptive Offset (SAO). The coding block may correspond to a coding unit (CU), multiple CUs, a largest coding unit (LCU) or multiple LCUs. The data payload in the video bitstream is in a picture level, Adaptation Parameter Set (APS), or a slice header. In one embodiment of the present invention, the flag is an interleaving flag which is used to select whether the information associated with the in-loop filter parameters is incorporated in the data payload in the video bitstream or interleaved with individual coding block data in the video bitstream. In another embodiment of the present invention, the flag is in a sequence level and the information associated with the in-loop filter parameters is incorporated in Adaptation Parameter Set (APS), or a slice header according to the flag.

BRIEF DESCRIPTION OF DRAWINGS

FIG. 4 illustrates an exemplary syntax design for seq_parameter_set_rbsp( ) to enable adaptive control of SAO processing across the slice boundary.

FIG. 5 illustrates an exemplary syntax design for aps_rbsp( ) to enable adaptive SAO parameter signaling to incorporate SAO parameters in APS or to interleave with block data in a slice.

FIG. 6 illustrates an exemplary syntax design for aps_sao_param( ) to allow coding blocks in a slice with aps_id referring to the APS to share SAO parameters in the APS.

FIG. 7 illustrates an exemplary syntax design for sao_unit_vlc( ) to incorporate SAO information for coding blocks.

FIG. 8 illustrates an exemplary syntax design for sao_offset_vlc( ) to incorporate SAO offset values for coding blocks.

FIG. 9 illustrates an exemplary syntax design for slice_header( ) to enable adaptive SAO parameter interleaving with block data.

FIG. 10 illustrates an exemplary syntax design for slice_data( ) to enable adaptive SAO parameter interleaving with block data.

FIG. 11 illustrates an exemplary syntax design for sao_unit_cabac( ) to enable adaptive SAO parameter interleaving with block data.

FIG. 12 illustrates an exemplary syntax design for sao_offset_cabac( ) to enable adaptive SAO parameter interleaving with block data.

FIG. 13 illustrates an exemplary syntax design for seq_parameter_set_rbsp( ) to enable adaptive ALF parameter signaling.

FIG. 14 illustrates an exemplary syntax design for slice_header( ) to enable adaptive ALF parameter signaling.

FIG. 15 illustrates an exemplary syntax design for alf_param( ) to enable adaptive ALF parameter signaling.

FIG. 16 illustrates an exemplary syntax design for alf_unit( ) to enable adaptive ALF parameter signaling.

FIG. 17 illustrates an exemplary syntax design for alf_info( ) to enable adaptive ALF parameter signaling.

DETAILED DESCRIPTION

In block-based in-loop filtering, the in-loop filter parameters for each block have to be conveyed to the decoder side for proper in-loop filtering operation at the decoder side. Examples of in-loop filter may include Sample Adaptive Offset (SAO) or Adaptive Loop Filter (ALF). In-loop filter is also termed as in-loop filter processing or in-loop processing in this disclosure. The in-loop parameters are also termed as in-loop information in this disclosure. When the block size is small, such as a Coding Unit (CU) or a Largest CU (LCU), the bitrate corresponding to the in-loop filter parameters becomes relatively large. Therefore, it is desirable to reduce the bitrate associated with the in-loop filter parameters. One embodiment according to the present invention uses a merge flag to indicate the case that a current block shares the in-loop filter parameters with a neighboring block or neighboring blocks. Furthermore, the block may include multiple LCUs to lower the bitrate corresponding to the in-loop filter parameters. The merge flag may also be determined implicitly. For example, if the blocks on the left and above have the same in-loop filter parameters, the current block will share the in-loop filter parameters with its left and above neighbors without the need to explicitly transmit the merge flag. The in-loop filter information can be incorporated into the compressed video bitstream.

Figure 1A:
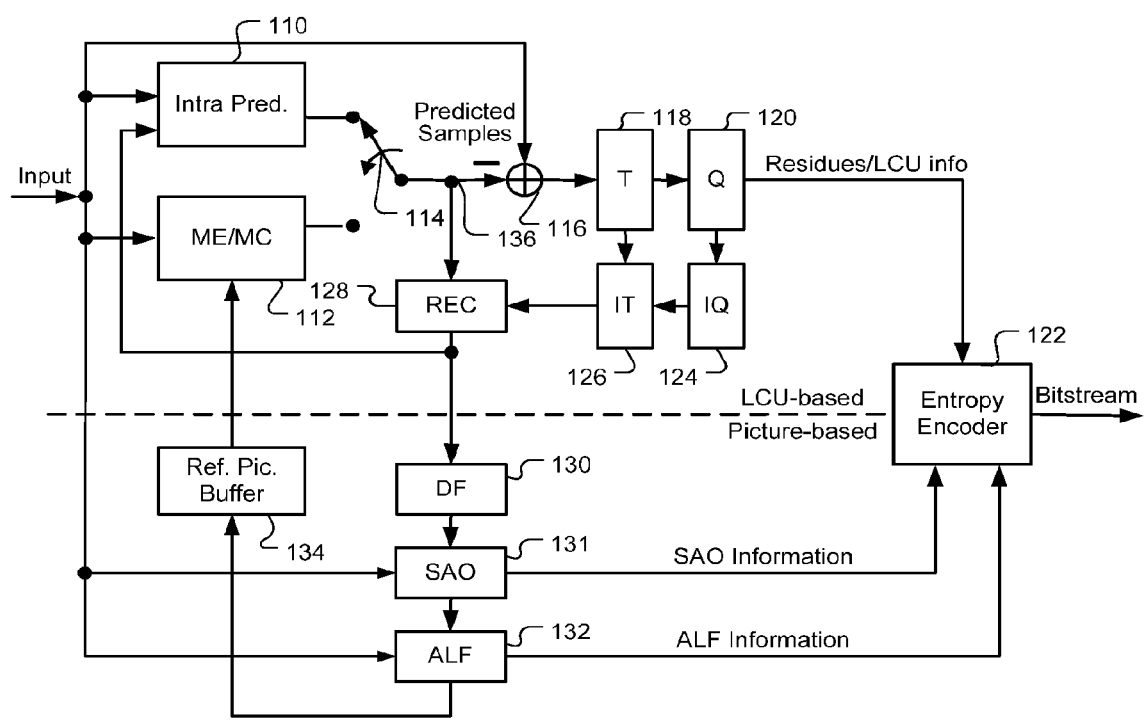
FIG. 1A illustrates an exemplary adaptive inter/intra video encoding system with DF, SAO and ALF in-loop processing.
Figure 1B:
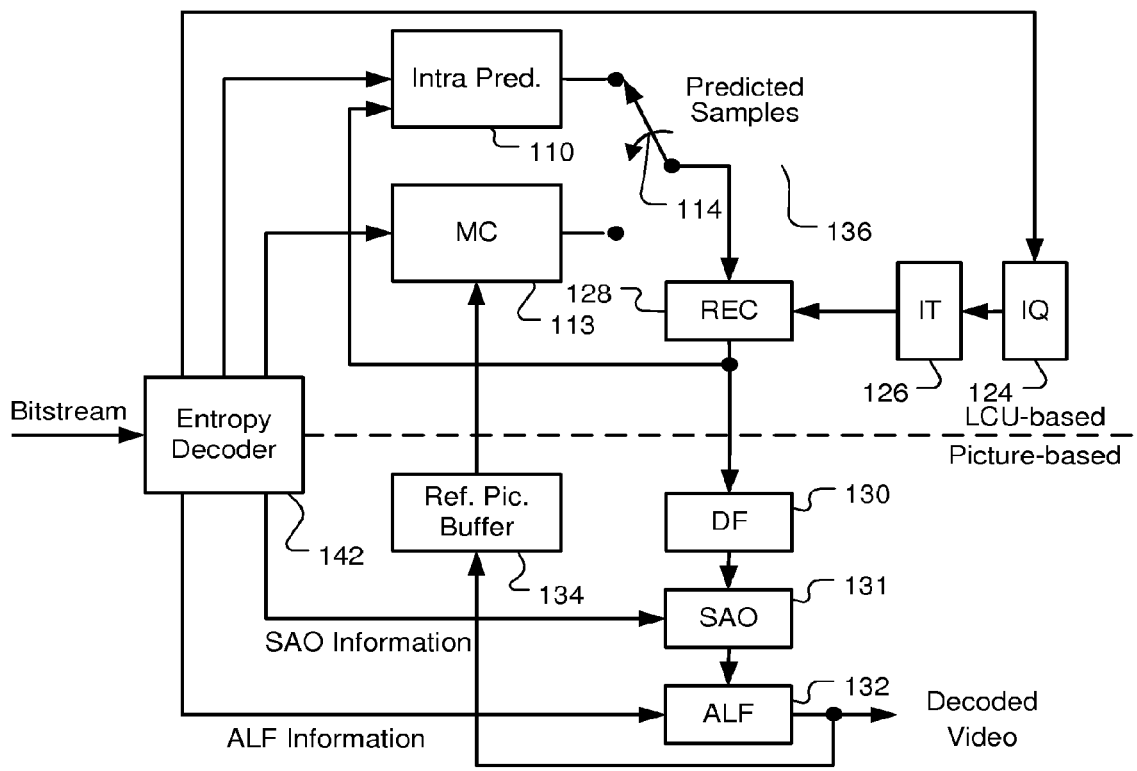
FIG. 1B illustrates an exemplary adaptive inter/intra video decoding system with DF, SAO and ALF in-loop processing.
Figures 2, 3:
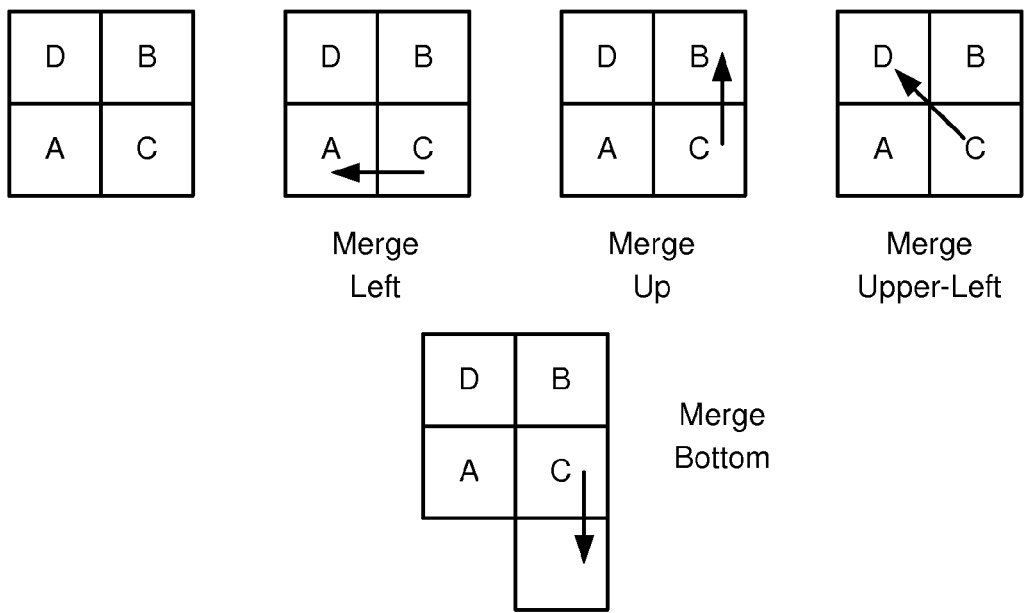
FIG. 2 illustrates an example of in-loop filter parameter sharing between a current block and neighboring blocks.
FIG. 3 illustrates an example of improved Edge Offset classification based on eight neighboring pixels in a 3×3 window around the current pixel.

The in-loop filter parameter sharing for a current block can select one of the neighboring blocks such as the block on the left, top, right, upper-left, bottom, bottom-left, and so on. The merge syntax is used to indicate that two blocks are merged together and share the same in-loop filter parameters. FIG. 2 illustrates an example of in-loop filter parameter sharing with a neighboring block. An exemplary process to determine whether a current block C should share in-loop filter parameters with a neighboring block is described as follows. If the SAO information of block A is not equal to that of B, X1 is set to one. Otherwise, X1 is set to zero. If the SAO information of block D is not equal to that of B, X2 is set to one. Otherwise, X2 is set to zero. If the SAO information of block D is not equal to that of A, X3 is set to one. Otherwise, X3 is set to zero. Variable X can be computed according to X=X3*4+X2*2+X1*1. Variable X can be used to select a neighboring block to merge with the current block.

In an exemplary merge process, when X equals to 7, a merge flag is incorporated to indicate whether block C uses new in-loop filter parameters or not. When the merge flag has a value of one, block C uses new in-loop filter parameters and otherwise, block C shares in-loop filter parameters with block A or B. When X is equal to 5, a merge flag is incorporated to indicate whether block C uses new in-loop filter parameters or not. When the merge flag has a value of one, block C uses new in-loop filter parameters and otherwise, block C shares in-loop filter parameters with block A. When X is equal to 3, a merge flag is incorporated to indicate whether block C uses new in-loop filter parameters or not. When the merge flag has a value of one, block C uses new in-loop filter parameters and otherwise, block C shares in-loop filter parameters with block B. Each block may be a CU, multiple CUs, an LCU, multiple LCU, or other block structure. The block may also correspond to different sizes. The block is also termed as coding block in this disclosure.

In a conventional approach, the SAO processing is only applied to the luma component. An embodiment according to the present invention also selectively applies the SAO processing to the chroma components if the SAO processing is applied to the luma component. When the SAO processing is applied to the luma component, a SAO chroma flag can be used to indicate whether the SAO processing is applied to the chroma components. The SAO information for a chroma component can be derived from the SAO information for the luma component or other chroma component(s). When a chroma component shares the SAO information with the luma component or other chroma component(s), an SAO information share flag can be used to indicate the case. The SAO information may include offset values, SAO type (also termed as category or class in this disclosure), and ON/OFF decision. In an embodiment, the offset values are pre-defined so that an index may be used to select one of the offset values. The SAO information may be incorporated in a data payload in the bitstream such as PPS, APS, or a slice header for multiple blocks to share.

Information associated with SAO parameters can be encoded based on SAO parameters of a previously processed block using a predictive method. Offset value coding may depend on the internal bit-depth increase, inter/intra mode information, motion information, transform size, quantization step size, residual, deblocking information, image size and region size. For example, if the internal bit-depth increase is larger than one, offset value coding may be increased by one bit. In another exemplary coding of SAO information, SAO parameters can change its coding precision according to quantization parameters. In order to reduce bitrate associated with SAO parameters, information for offset values may be encoded in a time-delayed fashion. Furthermore, the SAO information of a current slice can be shared with other slices or regions. Accordingly, the offset information can be incorporated in Picture Parameter Set (PPS). The coding blocks of a current slice or region can share the same SAO information.

In a conventional approach, the SAO processing is often applied after the DF processing. An embodiment according to the present invention may selectively apply between the DF processing and the SAO processing to a block. Alternatively, both the DF processing and the SAO processing can be applied to the same reconstructed video data and the outputs from both processing are linearly combined.

According to one embodiment of the present invention, the pixel classification method for SAO can be combined with other pixel classification methods such as edge direction, pixel intensity, pixel variation, pixel variance, pixel sum-of-Laplacian, high pass filtering result, low pass filtering result, absolute value of high pass filtering result, and mean value of neighboring pixels. For example, one category of Band Offset (BO) or Edge Offset (EO) can be further divided by EO. In another example, one category of EO can be further divided by BO or sum-of-Laplacian.

In conventional EO classification, two neighboring pixels in a 3×3 window are used to classify a current pixel into different categories or classes. An embodiment according to the present invention may use an improved classification method based on all neighboring pixels in the 3×3 window. The neighboring pixels (P1-8) around the current pixel C are show in FIG. 3. As an example, class index, ClassIdx can be defined as:

$$ClassIdx=Index2ClassTable(f(C,P_1)+f(C,P_2)+\ldots+f(C,P_8)),$$

where $f(C,P_n)$ is a comparison function and Index2ClassTable is mapping function to map the comparison results to class index. The comparison function $f(x,y)$ is defined as follows:

if $x-y>=th$, $f(x,y)=1$, if $x=y$, $f(x,y)=0$, and if $x-y<th$, $f(x,y)=-1$ where th is a threshold.

An alternative comparison function $f(x,y)$ may be defined as follows:

if $(x/s)-(y/s)>=th$, $f(x,y)=1$, if $(x/s)=(y/s)$, $f(x,y)=0$, and if $(x/s)-(y/s)<th$, $f(x,y)=-1$.

where th is a threshold and s is a scaling factor.

The improved EO classification method can be applied to the combined pixel classification method of SAO and other pixel classification methods. For example, a category of Edge Offset (EO) according to the improved EO classification mentioned above can be further divided by EO or BO.

In a conventional approach, the unit used for LCU-based ALF encoding is always one LCU. The improvement in distortion due to ALF is related to the size of the LCU. A smaller LCU usually allows the ALF design to be more tailored to local characteristics. However, the amount of information associated with ALF parameters is relatively constant and independent of the LCU size. Therefore, a smaller LCU size will result in higher bitrate associated with the information corresponding to the ALF parameters. Accordingly, the net bitrate available for coding video data may be substantially reduced and the system performance may be degraded. In order to overcome this problem, an embodiment according to the present invention groups multiple LCUs into one unit, called filter unit or coding block in this disclosure. Accordingly, the same ALF is applied to all LCUs in a filter unit and the ALF parameters are shared among all LCUs in one filter unit to reduce the bitrate required to incorporate the ALF parameters. The ALF parameter set may include one or more elements selected from a set consisting of filter coefficients, filter shape, filter size, ON/OFF control, and region information. A buffer may be used to store the ALF/SAO parameter set so that the information can be shared by other filter unit, slice, or picture. The filter unit can be as large as one picture or multiple LCUs. For example, a filter unit may consist of M×N LCUs, where M and N are integers greater than zero. The boundaries of one filter unit can be aligned or not aligned with LCU boundaries. When a filter unit is used, the ALF parameters can be designed based on the statistics associated with the filter unit. The ALF parameters designed can be applied to all pixels in the filter unit. The encoder may determine the value of M and N and incorporate the filter size information in sequence layer RBSP (Raw Byte Sequence Payload) or picture layer RBSP. Therefore, the side information corresponding to ALF can be reduced by sharing the in-loop parameters among multiple LCUs.

The filter candidates for a filter unit can be derived based on the underlying filter units, or the filter candidates can share at least a portion of the filter candidates used by previously processed filter units in the current slice. However, for the first filter unit in a slice, there is no previously processed filter unit in the slice for the current filter unit to share. Therefore, default filter candidates or other means have to be used to process the first filter unit and the performance may be degraded. In a conventional approach, the ALF parameters are derived from one filter unit (an LCU or a picture) without any information from other filter units. An embodiment according to the present invention allows using the information from a previous frame or previously processed filter units for deriving some filter candidates for a current filter unit. For example, the statistics of filter units with the ALF-Off mode in the previous frame can be used to derive parameters for one filter and the filter can be used as one filter candidate for the current filter unit. The filter derived from the ALF-On filter units in the previous frame can be used as another filter candidate. Furthermore, a picture can be divided into multiple partitions and the respective filters for the ALF-ON and ALF-OFF filter units in each partition can be derived. One of these filters can be used as a filter candidate for current filter units. The statistics of previously processed units in a current slice may be accumulated to derive filter candidates based on the accumulated statistics.

According to the conventional ALF processing, the processing of chroma components can be independent of the processing of luma component or always follows the processing of luma component. An embodiment according to the present invention combines both methods adaptively. One syntax is used to indicate whether the chroma component is filtered or not, and another syntax is used to indicate whether chroma components share the filter with the luma component or uses its own as incorporated in the bitstream. Therefore, the filter coefficients for the chroma components can be either derived from the luma filter or decoded from the bitstream. Furthermore, in order to reduce side information associated with the ALF parameters, the filter footprint for the chroma components can be a subset of the filters for the luma component.

When previous ALF parameters are shared, the parameters in prior filter units of the current slice can be reused by the subsequent filter units. For SAO processing, the parameters in prior regions or LCUs of the current slice can be reused by the following regions or LCUs. For convenience, the filter unit may also refer to a region or an LCU. How much further back that the previous ALF parameters can be reuse may be defined by a user or may be dependent on picture size. When the ALF/SAO information is shared, the ALF/SAO information may be derived or copied from previously coded region, previously coded picture, or pre-defined ALF/SAO information. The ALF information may include one or more elements from the set consisting of filter coefficients, filter shape, filter size, ON/OFF control, and region information.

Each filter unit may use an index to select previous ALF/SAO parameters stored in a buffer. The index can be entropy coded adaptively to reduce bitrate. For example, a set of more frequently selected ALF/SAO parameters may be assigned a shorter codeword. In another example, a predictive coding technique can be used where one or more most-probable-modes are determined. If the current index is equal to one of the most probable modes, a very short codeword can be used to code the index. Otherwise, it will require more bits to identify which one of the remaining indices is the same as the current index. The technique is similar to the most probable mode coding technique used in intra mode coding. The corresponding syntax for the index can be incorporated in Adaptation Parameter Set (APS), Picture Parameters Set (PPS), a slice header, or slice data. Information associated with ALF can be incorporated in Adaptation Parameter Set (APS), a slice header, slice data, or adaptively changed based on a flag incorporated in Sequence Parameter Set (SPS), Picture Parameter Set (PPS), Adaptation Parameter Set (APS), or a slice header according to an embodiment of the present invention.

In another example for enabling adaptive ALF parameter signaling, an ALF parameter interleaving flag or SAO parameter interleaving flag can be used to indicate if the ALF parameters for each filter unit (as mentioned before, the filter unit may refer to a region of an LCU) are interleaved with filter unit data in the slice. The ALF parameter interleaving flag or SAO parameter interleaving flag can be incorporated in Picture Parameter Set (PPS), Adaptation Parameter Set (APS), or a slice header. Furthermore, the flag for indicating interleaving can be incorporated in multiple RBSPs simultaneously such as APS and a slice header. When the flag for indicating interleaving exists in multiple RBSPs, the flag should have the same value in the multiple RBSPs. Accordingly, the embodiment of the present invention also provides the capability of redundancy to protect the interleaving flag.

For SAO, a flag, sao_max_region_size_minus_one, may be used to indicate the maximum number of LCUs in one SAO processing region. The maximum number of LCUs for an SAO processing region is sao_max_region_size_minus_one+1. The flag, sao_max_region_size_minus_one can be incorporated in Picture Parameter Set (PPS), Sequence Parameter Set (SPS), Adaptation Parameter Set (APS), slice header, or more than one of the above. The LCUs in the same SAO processing region may share the same SAO parameters. For example, if sao_max_region_size_minus_one is zero, the maximum number of LCUs in one SAO processing region is set to one. If LCU-based syntax design and "run" coding are used, the "run" value indicates the number of LCUs that sharing the same SAO parameters. For some applications, small LCU size, such as 16×16, may be used. In this case, bitrate associated with run length coding of consecutive LCUs in a region sharing the SAO parameters may be relatively high. Therefore, the "run" value is used to indicate the number of regions sharing the same SAO parameters.

Run-length coding can be applied to ALF parameters as well. A filter unit may consist of one LCU and filter unit-based processing becomes LCU based processing in this case. Consecutive filter units may share the same ALF parameters. To reduce the bitrate for indicating ALF parameter sharing, run-length coding is used to indicate the number of consecutive filter units sharing the ALF parameters with the current filter unit.

For fine-granularity slice case, the granularity block may be smaller than one LCU. In this case, one LCU may include more than one slice data, i.e., one LCU may contain more than one set of ALF/SAO parameters. An embodiment according to the present invention will force all in-loop filter parameters in one LCU to be the same.

Picture-based in-loop design has to wait till the complete picture becomes available. It may cause processing delay. However, it may not be an issue for non-reference pictures. An embodiment according to the present invention may simply skip the actual filtering step after filter parameters are derived. Instead, in a picture-based approach, the in-loop processing can be applied to non-reference pictures without causing any extra encoding latency or additional picture memory access.

The in-loop filter processing at the encoder side involves two separate steps. In the first step, the statistics are collected from the underlying LCU or picture. The in-loop filter parameters are then derived based on the collected statistics. In the second stage, the in-loop filter processing is applied to pixels in the LCU or picture based on the derived in-loop filter parameters. Since each in-loop processing, such as the ALF processing, is performed in separate steps, it may cause sizeable data access. An embodiment according to the present invention combines one of the in-loop filter processing steps with other in-loop filter processing to reduce the associated data access. For example, the first step of the ALF/SAO processing is to collect statistics, which can be performed along with other LCU-based coding tool, such as deblocking process. Accordingly, the statistics for the ALF/SAO processing can be collected during deblocking process. Consequently, the ALF/SAO parameters can be derived without any additional picture memory access. The second step of the ALF/SAO processing involves applying filtering to pixel data, which can be carried out during the later motion estimation process. Therefore, the ALF/SAO process at the encoder side can be performed without any separate memory access, which is termed as zero-pass encoding in this disclosure. In the decoder side, there is no need to collect statistics for ALF/SAO filter design. Nevertheless, the decoder still can take advantage of the zero-pass decoding by performing the ALF/SAO filter processing during motion compensation.

For some low latency applications, filter unit-based processing is preferred. For filter unit-based encoding, the ON/OFF control decision of one filter unit is expected to be finished once the filter unit coding results are available. Furthermore, the compressed data associated with the filter unit is preferred to be interleaved with in-loop filter parameters in a slice. For low latency applications, slice-level ON/OFF control may cause long encoding latency. Accordingly, an embodiment of the present invention always explicitly sets the slice-level ON/OFF control flag to indicate ON when loop filter parameters are coded and interleaved with filter unit data (also called block data in this disclosure) in a slice. Alternatively, an embodiment of the present invention may conditionally disable the slice-level ON/OFF control flag. If the loop filter parameters are coded and interleaved in a slice, slice-level ON/OFF control flag is not sent. Otherwise, the slice-level ON/OFF control flag is sent.

In a conventional approach, the number of offsets in each region for BO and EO is different. An embodiment according to the present invention unifies the number of offsets in each region for BO and EO. Accordingly the number of BO groups is changed to eight, and each BO group has four offsets for each region. Reducing the number of offsets for each group can reduce the associated bitrate. The bitrate associated with the offsets may also be reduced according to an embodiment of the present invention. For example, the range of offsets can be constrained to a smaller range. This will be useful for small regions where the offsets are expected to be smaller. The buffer required for offset prediction based on neighboring blocks may be reduced according to an embodiment of the present invention. For example, the offset prediction can avoid using the offset for the LCU above the current LCU. The in-loop filtering operations include deblocking filter, SAO, and ALF. The chroma SAO processing can be improved according to an embodiment of the present invention by conditionally enabling chroma SAO processing depending on whether luma SAO processing is enabled. In another embodiment according to the present invention, the offsets for chroma and luma components may be shared when EO is selected.

Various syntax designs are illustrated herein as exemplary embodiments according to the present invention. FIG. 4 illustrates an exemplary Sequence Parameter Set syntax structure according to the present invention, where loop_filter_across_slice_flag is incorporated. If loop_filter_across_slice_flag is equal to one, the in-loop filtering operations can be performed across slice boundary. If loop_filter_across_slice_flag is equal to zero, the in-loop filtering operations are slice-independent and the operations will not across slice boundaries. Accordingly, the buffer required for in-loop filter parameter prediction based on neighboring blocks can be reduced according to an embodiment of the present invention.

FIG. 5 illustrates an example of incorporating an SAO parameter interleaving flag in APS. In FIG. 5, aps_id identifies the adaptation parameter set (APS) that is referred to by coding blocks in a slice with the corresponding aps_id in the slice header. When the SAO parameter interleaving flag, i.e., aps_sao_interleaving_flag is equal to one, the SAO parameters are interleaved with filter unit data for the slices referring to the APS as indicated by aps_id. When aps_sao_interleaving_flag is equal to zero, the SAO parameters are incorporated in APS for slices referring to the APS. Another flag, i.e., aps_sample_adaptive_offset_flag is incorporated in the APS to control filter ON/OFF. If aps_sample_adaptive_offset_flag is equal to one, SAO is ON for slices referring to the APS as indicated by aps_id. On the other hand, if aps_sample_adaptive_offset_flag is equal to zero, the SAO is OFF for slices referring to the APS as indicated by aps_id.

FIG. 6 illustrates an exemplary syntax design, aps_sao_param( ), for SAO parameters in APS according to an embodiment of the present invention. The syntax structure includes the SAO information required for SAO processing. For example, the syntax structure may include a flag or flags, such as sao_cb_enable_flag and sao_cr_enable_flag in FIG. 6 to determine whether SAO processing is applied to respective chroma components of the current picture. The syntax structure may also include information regarding picture size in terms of LCU size, such as sao_num_lcu_in_width_minus1 and sao_num_lcu_in_height_minus1 in FIG. 6. The syntax structure may also include information regarding whether all coding units in a slice are processed using the same SAO parameters or individual SAO parameters for each largest coding unit or filter unit, as indicated by sao_one_luma_unit_flag, sao_one_cb_unit_flag and sao_one_cr_unit_flag respectively in FIG. 6. If any of the above flag has a value of one, SAO offset values will be incorporated is respective sao_offset_vlc( ) for the coding blocks in the slice to share. The syntax structure may also include an indication, such as sao_repeat_row_flag[cIdx], regarding whether the SAO parameters of coding blocks in the current coding block row, such as an LCU row, are the same as those above coding block for the respective color component index, cIdx.

In the above exemplary syntax structure, aps_sao_param( ), SAO block structure, sao_unit_vlc( ) is also incorporated along with respective repeat-row flag. FIG. 7 illustrates an exemplary syntax structure, sao_unit_vlc( ), which includes information associated with SAO parameter sharing information among coding blocks, such as sao_run_diff and sao_merge_up_flag. The number of times that the SAO parameters corresponding to a coding block are repeated for subsequent coding blocks in the same row is represented by saoRun[cIdx][rx][ry]. The array index cIdx specifies the color component; cIdx has a value of 0, 1, or 2 corresponding to luma, Cb, or Cr respectively. The array indices rx and ry specify the location of the underlying coding block relative to the top-left coding block of the picture. Syntax element, sao_run_diff specifies the saoRun[ ][ ][ ] of the current coding block if the current row is the first row, otherwise specifies the difference between the run of current coding block and the run of the above coding block. When saoRun[ ][ ][ ] is greater than or equal to zero, the syntax elements in sao_offset_vlc( ) are derived from the corresponding syntax elements of the left coding block. The length of the sao_run_diff syntax element is Ceil(Log2(sao_num_lcu_in_width_minus1−rx+2)) bits. When flag, sao_merge_up_flag is equal to one, the syntax elements in sao_offset_vlc( ) are derived from the corresponding syntax elements of the above coding block. When flag, sao_merge_up_flag is equal to zero, the syntax elements in sao_offset_vlc( ) are not derived from the corresponding syntax elements of the above coding block. When sao_merge_up_flag is not present, it is inferred to be zero.

FIG. 8 illustrates an exemplary syntax structure for sao_offset_vlc( ) according to an embodiment of the present invention. Syntax element sao_type_idx[cIdx][rx][ry] indicates the SAO type which may be BO (Band Offset) or EO (Edge Offset). When sao_type_idx[cIdx][rx][ry] has a value of 0, it indicates that SAO is OFF; a value of one to four, it indicates that one of the four EO categories corresponding to 0°, 90°, 135°, and 45° is used; and a value of five, it indicates that BO is used. In the above example, both the BO and EO types have four SAO offset values.

FIG. 9 illustrates an exemplary syntax structure for slice header to allow SAO parameters to be incorporated in a slice header adaptively according to an embodiment of the present invention. When SAO is enabled among other conditions as indicated by the flag, sample_adaptive_offset_enabled_flag, two additional flags, i.e., slice_sao_interleaving_flag and slice_sample_adaptive_offset_flag are incorporated in the slice header. If slice_sao_interleaving_flag is equal to one, the SAO parameters are interleaved with filter unit data in the slice data. If slice_sao_interleaving_flag is equal to zero, the SAO parameters use information incorporated in the APS as referred to by aps_id. The flag for indicating interleaving can be incorporated in multiple RBSPs simultaneously such as APS and the slice header. When the flag for indicating interleaving exists in multiple RBSPs, the flag should have the same value in the multiple RBSPs. Accordingly, when there is an active APS, the value of slice_sao_interleaving_flag in the slice header will be the same as aps_sao_interleaving_flag in APS. If slice_sample_adaptive_offset_flag is equal to one, the SAO is ON for the current slice. If slice_sample_adaptive_offset_flag is equal to zero, the SAO is OFF for the current slice. Similarly, when there is an active APS, the value of slice_sample_adaptive_offset_flag will be the same as aps_sample_adaptive_offset_flag. Accordingly, the embodiment of the present invention also provides the capability of redundancy to protect the interleaving_flag.

FIG. 10 illustrates an exemplary syntax structure, slice_data( ), for slice data to support adaptive SAO parameter signaling according to an embodiment of the present invention. As shown in FIG. 10, when slice_sao_interleaving_flag has a value of one, individual SAO unit data (i.e., sao_unit_cabac( )) is incorporated if the respective SAO enable flag is ON.

FIG. 11 illustrates an exemplary syntax structure, sao_unit_cabac ( ), for SAO unit data according to an embodiment of the present invention. Merge flags, sao_merge_left_flag and sao_merge_up_flag are used to indicate whether the current coding block shares SAO offsets with the left or above coding unit respectively. When the current coding unit does not share SAO parameters with its neighboring block on the left or above, SAO offsets, sao_offset_cabac( ), are incorporated for the current coding block.

FIG. 12 illustrates an exemplary syntax structure for sao_offset_cabac( ) according to an embodiment of the present invention. Syntax element sao_type_idx[cIdx][rx][ry] indicates the SAO type which may be BO (Band Offset) or EO (Edge Offset). When sao_type_idx[cIdx][rx][ry] has a value of 0, it indicates that SAO is OFF; a value of one to four, it indicates that one of the four EOs corresponding to 0°, 90°, 135°, and 45° is used; and a value of five, it indicates that BO is used. In the above example, both the BO and EO type have four SAO offset values. When sao_type_idx[cIdx][rx][ry] is not present, sao_type_idx[cIdx][rx][ry] can be inferred. For example, if sao_merge_up_flag is equal to one, sao_type_idx[cIdx][rx][ry] is set equal to sao_type_idx[cIdx][rx][ry−1]. Otherwise, sao_type_idx[cIdx][rx][ry] is set to be equal to sao_type_idx[cIdx][rx−1][ry].

FIG. 13 illustrates an example of syntax design seq_parameter_set_rbsp( ), for SPS to support a flag for adaptively incorporating ALF information. As shown in FIG. 13, the flag, adaptive_loop_filter_enabled_flag is used to indicate whether adaptive ALF parameter incorporation is allowed. When adaptive ALF parameter incorporation is enabled as indicated by adaptive_loop_filter_enabled_flag, another flag, alf_coef_in_slice_flag, is used to indicate where the ALF parameters are incorporated. When alf_coef_in_slice_flag is equal to one, syntax alf_param( ) for ALF parameters is incorporated in the slice header. When alf_coef_in_slice_flag is equal to zero, syntax alf_param( ) for ALF parameters will be incorporated in the APS. In slice level syntax, if alf_coef_in_slice_flag is equal to one, ALF parameters may be incorporated in a slice header. Furthermore, the ALF CU ON/OFF control parameters will not be incorporated in the slice level.

FIG. 14 illustrates an exemplary slice header design that allows ALF parameters to be incorporated in the slice header adaptively according to adaptive_loop_filter_enabled_flag and alf_coef_in_slice_flag mentioned in FIG. 13. When ALF is enabled as indicated by adaptive_loop_filter_enabled_flag, another flag, slice adaptive_loop_filter flag is used to indicate whether slice level ALF is applied. If slice level ALF is applied and alf_coef_in_slice_flag indicates that ALF parameters are incorporated in the slice header, syntax alf_param( ) is incorporated in the slice header. On the other hand, if slice level ALF is applied and alf_coef_in_slice_flag indicates that ALF parameters are not incorporated in the slice header, syntax alf_cu_control_param( ) will be incorporated in the slice header.

FIG. 15 illustrates an exemplary syntax design for ALF parameters according to an embodiment of the present invention. The syntax structure contains the ALF information required for ALF processing. For example, the syntax structure may include a flag or flags, such as alf_cb_enable_flag and alf_cr_enable_flag in FIG. 15 to determine whether ALF processing is applied to respective chroma components of the current picture. The syntax structure may also include information regarding picture size in terms of LCU size, such as alf_num_lcu_in_width_minus1 and alf_num_lcu_in_height_minus1 in FIG. 15. The syntax structure may also include information regarding whether all coding units in a slice are processed using the same ALF parameters or individual ALF parameters for each largest coding unit or filter unit, as indicated by alf_one_luma_unit_flag, alf_one_cb_unit_flag and alf_one_cr_unit_flag respectively in FIG. 15. The syntax structure may also include an indication, such as alf_repeat_row_flag[cIdx], regarding whether the ALF parameters of coding blocks in the current coding block row are the same as those above coding block for the respective color component index, cIdx.

FIG. 16 illustrates an exemplary syntax structure, alf_unit( ), for ALF coding blocks according to an embodiment of the present invention. Syntax alf_unit( ) includes information associated with ALF parameter sharing information among coding blocks, such as alf_run_diff and alf_merge_up_flag. The number of times that the ALF parameters corresponding to a coding block are repeated for subsequent coding blocks in the same row is represented by alfRun[cIdx][rx][ry]. The array index cIdx specifies the color component; cIdx has a value of 0, 1, or 2 corresponding to luma, Cb, or Cr respectively. The array indices rx and ry specify the location of the underlying coding block relative to the top-left coding block of the picture. Syntax element, alf_run_diff specifies the alfRun[ ][ ][ ] of the current coding block if the current row is the first row, otherwise specifies the difference between the run of current coding block and the run of the above coding block. When alfRun[ ][ ][ ] is greater than or equal to zero, the syntax elements in alf_info( ) are derived from the corresponding syntax elements of the left coding block. The length of the alf_run_diff syntax element is Ceil(Log 2(alf_num_lcu_in_width_minus1−rx+2)) bits. When flag, alf_merge_up_flag is equal to one, the syntax elements in alf_info( ) are derived from the corresponding syntax elements of the above coding block. When flag, alf_merge_up_flag is equal to zero, the syntax elements in alf_info( ) are not derived from the corresponding syntax elements of the above coding block. When alf_merge_up_flag is not present, it is inferred to be zero.

FIG. 17 illustrates an exemplary syntax structure for ALF information, alf_info( ) according to an embodiment of the present invention. Syntax alf_info( ) includes information associated with the ALF filter. The exemplary syntax design supports the use of ALF buffer so that an index can be used to select one of multiple ALF filters stored in the ALF buffer. For example, when alf_new_filter_set_flag is equal to one, it indicates that the current coding block uses a new filter set. Otherwise, the current coding block uses the stored filter set with the buffer index equal to alf_stored_filter_set_idx[cIdx] When alf_new_filter_set_flag is not present, it is inferred to be one. When alf_new_filter_set_flag is equal to one, NumALFFiltersInStoredBuffer[cIdx] is increased by one, where NumALFFiltersInStoredBuffer[cIdx] is the number of filters in the filter set. Syntax alf_stored_filter_set_idx[cIdx] specifies the buffer index of the stored filters for the color component cIdx. The length of the alf_stored_filter_set_idx[cIdx] syntax element is Floor(Log 2(Min(1, NumALFFiltersInStoredBuffer[cIdx] 1)))+1 bits. Syntax element alf_no_filters_minus1 is used to derive the number of filter sets for the current coding block, where alf_no_filters_minus1 has a value from 0 to 2. Syntax element alf_start_second_filter specifies the block adaptive (BA) mode index of luma samples for which the second filter is applied. When syntax element alf_filter_pattern_flag[cIdx][ry][rx][i] is equal to one, the filter index for the i-th BA mode index is increased by one. When syntax element alf_filter_pattern_flag[cIdx][ry][rx][i] is equal to zero, the filter index for the i-th BA mode index is the same as (i−1)th BA mode index. When syntax element alf_pred_flag[ ][ ][ ][ ] is equal to one, the filter coefficients for the current coding block are coded in a predictive manner; otherwise the filter coefficients are coded directly. Syntax element alf_min_kstart_minus1+1 specifies the minimum order k of k-th order exponential Golomb code for the luma filter coefficients for the adaptive loop filter. Syntax element alf_golomb_index_flag[i] specifies the difference in the order of k-th order exponential Golomb codes between i-th group and (i+1)-th group of the luma filter coefficients. There are multiple groups of the luma filter coefficients where each group may have a different order k. When syntax element alf_nb_pred_luma_flag[cIdx][ry][rx][i] is equal to one, the filter coefficients of i-th filter for the current coding block are coded in a predictive manner based on spatially neighboring filter coefficients; otherwise the filter coefficients are not coded using spatially neighboring filter coefficients. Syntax element alf_filt_coeff[cIdx][ry][rx][i] specifies the j-th filter coefficient of i-th filter used in the adaptive loop filtering process for the current coding block.

Embodiment of video coding systems incorporating improved SAO and/or ALF processing according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for video coding with sample adaptive offset (SAO) processing of reconstructed video, the method comprising:
    receiving reconstructed video data; and
    applying the SAO processing to regions of the reconstructed video data, wherein each region is processed by an SAO type and offset values; and
    encoding or decoding according to the SAO processed reconstructed video data;
    wherein the SAO type comprises Band Offset (BO) and Edge Offset (EO) types, and
    an SAO type index is used to indicate the SAO processing is one of four EO categories corresponding to 0°, 90°, 135°, and 45° is used.

2. The method of claim 1, wherein a number of offset values in each region for the BO type and for the EO type is the same.

3. The method of claim 2, wherein the number of offset values in each region for EO type and BO type is four.

* * * * *